United States Patent
Prieur (12)

(10) Patent No.: US 6,470,075 B1
(45) Date of Patent: Oct. 22, 2002

(54) AUTOMATIC MONITORING SERVICE FOR TELECOMMUNICATIONS NETWORKS

(75) Inventor: Luc Prieur, Laval (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/325,130

(22) Filed: Jun. 8, 1999

(51) Int. Cl.[7] ............... H04M 11/04; H04M 1/24
(52) U.S. Cl. ................................. 379/38; 379/35
(58) Field of Search ............... 379/37–51, 93.01, 379/93.06–93.08, 35, 32.05, 201.01

(56) References Cited

U.S. PATENT DOCUMENTS

| | | | |
|---|---|---|---|
| 5,590,171 A | * | 12/1996 | Howe et al. |
| 5,881,132 A | * | 3/1999 | O'Brien et al. |
| 5,920,611 A | * | 7/1999 | Howell |
| 5,956,390 A | * | 9/1999 | McKibben et al. ...... 379/93.07 |

* cited by examiner

Primary Examiner—Wing Chan
(74) Attorney, Agent, or Firm—Smith, Danamraj & Youst, P.C.; Alex Nicolaescu

(57) ABSTRACT

A method and system for determining whether at least one telephone subscriber participating in a communication session is marked for monitoring by a Law Enforcement Agency (LEA) and, if so, for automatically marking for monitoring all remaining participants in the communication session. In a presently preferred exemplary embodiment, the subscribers are marked for monitoring their communications for a selected period of time by a starting the timer each time a new subscriber is marked. In another preferred exemplary embodiment, the subscribers marking level is detected and verified to determine if the marking level satisfies a predefined condition associated therewith. If so, the corresponding subscriber is marked for monitoring and the subscriber's subsequent communications are monitored.

10 Claims, 7 Drawing Sheets

AUTOMATIC MONITORING SERVICE FOR TELECOMMUNICATIONS NETWORKS

BACKGROUND OF THE INVENTION

1. Field of the Invention

The present invention relates to monitoring methods for telecommunication transmissions, more particularly to a method and apparatus for automatically marking a mobile subscriber or terminal for monitoring a telephone communication session or transmission associated therewith.

2. Description of the Prior Art

Law Enforcement Agencies (LEAs) may sometimes require a cellular operator, i.e. the company operating a cellular telecommunication network, to intercept communications of cellular subscribers, and then forward both the content of the communication and the call identifying information to them. Such an action is typically performed when the LEAs obtain a court order for monitoring a particular subscriber line. Once the court approval is obtained, the LEA requests the cellular operator to monitor the communications of the subscriber and furnishes the subscriber's personal identification thereto for the purpose of monitoring. It is the responsibility of the cellular operator, then, to perform the monitoring, i.e. gather communication data related to the monitored subscriber, and to forward it to the LEA. The forwarding of this information may either be performed at spaced intervals or, as it is more and more likely to happen, in quasi real-time.

Various methods exist for marking or otherwise identifying a telephone subscriber, such as a cellular subscriber, for monitoring the communications sessions or transmissions associated therewith. In some cases, the LEAs may want to monitor the subscriber, and in that case the cellular operator may use the Mobile Identification Number (MIN), the Mobile Directory Number (MDN), or the International Mobile Subscriber Identity (IMSI) for tracing communications involving that subscriber. When such techniques are used, it is the subscriber (through the subscriber profile that may be stored in a SIMM card within the mobile phone) who is monitored. In other cases, the LEAs may want to monitor only communications involving a particular equipment, such as a particular mobile station, and in that case the cellular operator may use the Electronic Serial Number (ESN), or the International Mobile Equipment Identity (IMEI), which are unique to each mobile station.

Current techniques of monitoring a marked subscriber have considerable shortcomings and deficiencies. Typically, monitoring a subscriber means that calls emanating from or received by only the marked subscriber are monitored. In other words, communications relating to the subscribers who either called the marked subscriber or were called by the marked subscriber are not monitored at all. It can be readily appreciated that by not monitoring additional subscribers who have been participants in communications with the marked subscriber, chances for the LEA to gather potentially incriminating information related to the monitoring subscriber are greatly reduced. Indeed, it can be surmised that the monitored subscribers pay attention to the content of their communications, and therefore avoid divulging or transmitting potentially incriminating information from their own mobile terminal. Instead, such incriminating information may be found in additional communications emanating from the participating subscribers subsequently talk to other subscribers.

Therefore, it would be advantageous to have a system and method that allows systematic and automatic supervision of communications emanating either from subscribers once called by the monitored subscriber, or from subscribers who once called the monitored subscriber. It would be of further advantage if such a system and method could be implemented in both the cellular telecommunications network and the Public Switched Telephone Network (PSTN), either cumulatively or involving separate portions thereof.

SUMMARY OF THE INVENTION

It is therefore one broad object of this invention to provide a method and apparatus for automatically marking for monitoring at least one or more un-marked participants in a telephone communication session or transmission with a subscriber marked for monitoring by the LEA.

The present invention overcomes the disadvantages of the prior art methods for monitoring a subscriber, by allowing automatic monitoring of subscribers who have been contacted, or who have contacted the monitored subscriber. In this manner, the chances for the LEAs for finding potentially incriminating information relating to the monitor subscribers are greatly improved, since not only the communications of the initially monitored subscriber are monitored, but also those of the other subscribers contacted by the initially monitored subscriber, which may not involve the initially monitored subscriber.

In one aspect of the invention, when a subscriber is marked for automatic monitoring (the marking uses preferably one of the identification data types explained in the Background section), a timer associated with each one of the marked subscribers is started, so that the monitoring may be performed, preferably, only for a selected period of time, thus avoiding overloading the network.

In another aspect of the invention, a marking level associated with the subscriber to be monitored is detected prior to marking the subscriber. Preferably, the subscriber is marked for monitoring only when the detected marking level associated with the subscriber satisfies a pre-defined condition.

In yet another aspect, only a limited number of communication sessions or transmissions are preferably monitored for a newly marked subscriber. Once a predetermined threshold level associated with the number of communication sessions is reached, the subscriber is then un-marked so that the subscriber would no longer be monitored.

In one embodiment, the present invention is drawn to a method for automatically marking for monitoring at least one telephone subscriber participating in a communication transmission in a telephone network. First, the communication transmission is set up in a telephone network between at least two telephone subscribers such that the transmission emanates from a first subscriber and is directed to the other. If at least one of the subscribers participating in the communication transmission is detected to be marked for monitoring, the method automatically marks the remaining subscribers participating in the communication transmission for subsequent monitoring.

In another embodiment, the present invention is directed to a telephone network system comprising communication switching means for setting up a communication session between at least two subscribers. The telephone network system is also provided with intercepting means for intercepting the content, identifying information, or both, associated with the communication session. Also provided is monitoring marking means which detects the presence of a monitored subscriber among the subscribers participating in the communication session. When the monitoring marking means detects that a monitored subscriber is present among the participating subscribers, the remaining subscribers are automatically marks for monitoring also.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
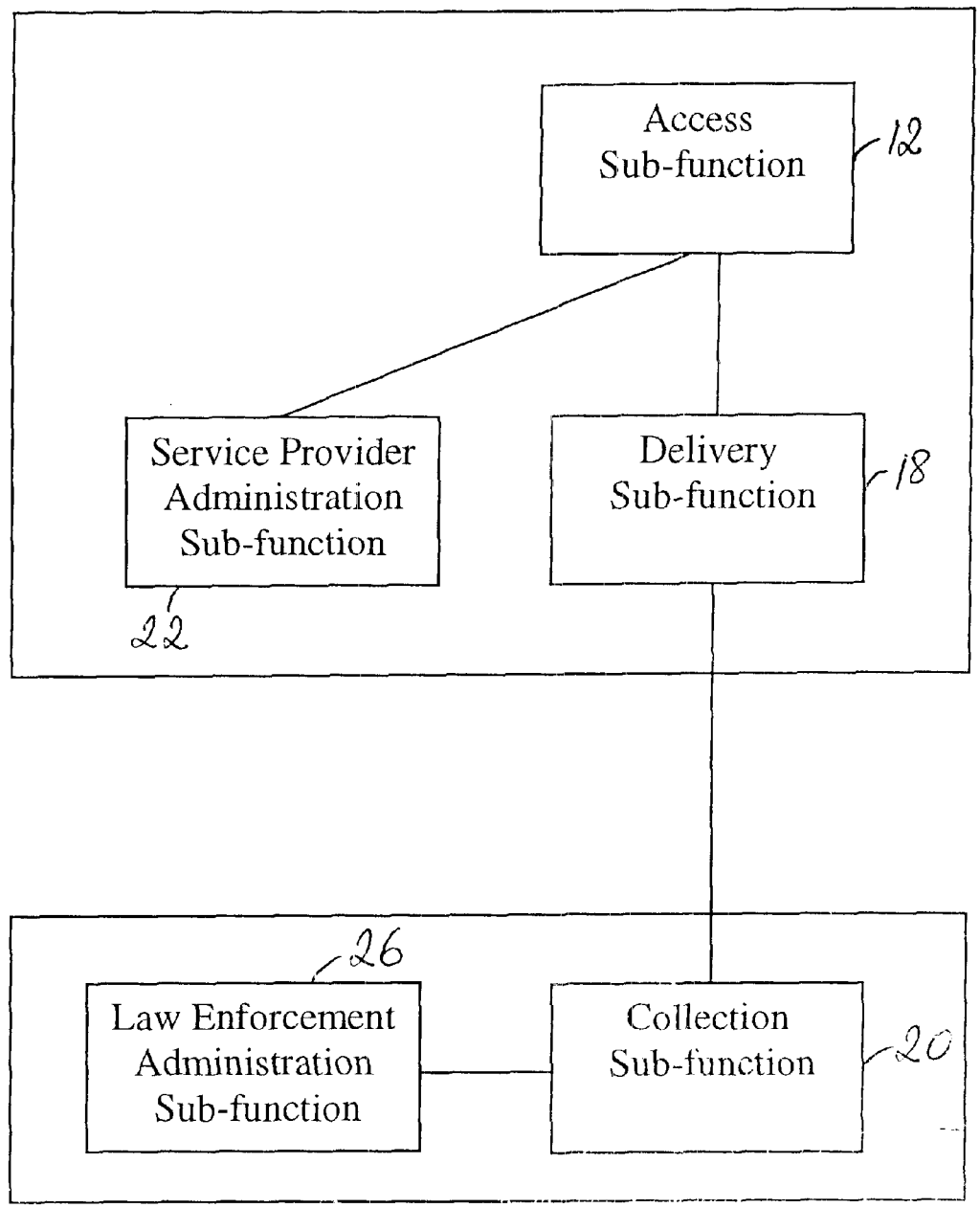
FIG. 1 (Prior Art) depicts a logical network reference model of the existing monitoring-related functions within a typical cellular telecommunication network.

Reference is now made to FIG. 1, which illustrates a logical network reference model of the monitoring functionality in a cellular telecommunication network such as, for example, the network shown in FIG. 2 and described in greater detail hereinbelow. The monitoring functionality typically comprises several sub-functions: the access sub-function 12, the delivery sub-function 18, the collection sub-function 20, the service provider administration sub-function 22 and the law enforcement administration sub-function 26.

Figure 2:
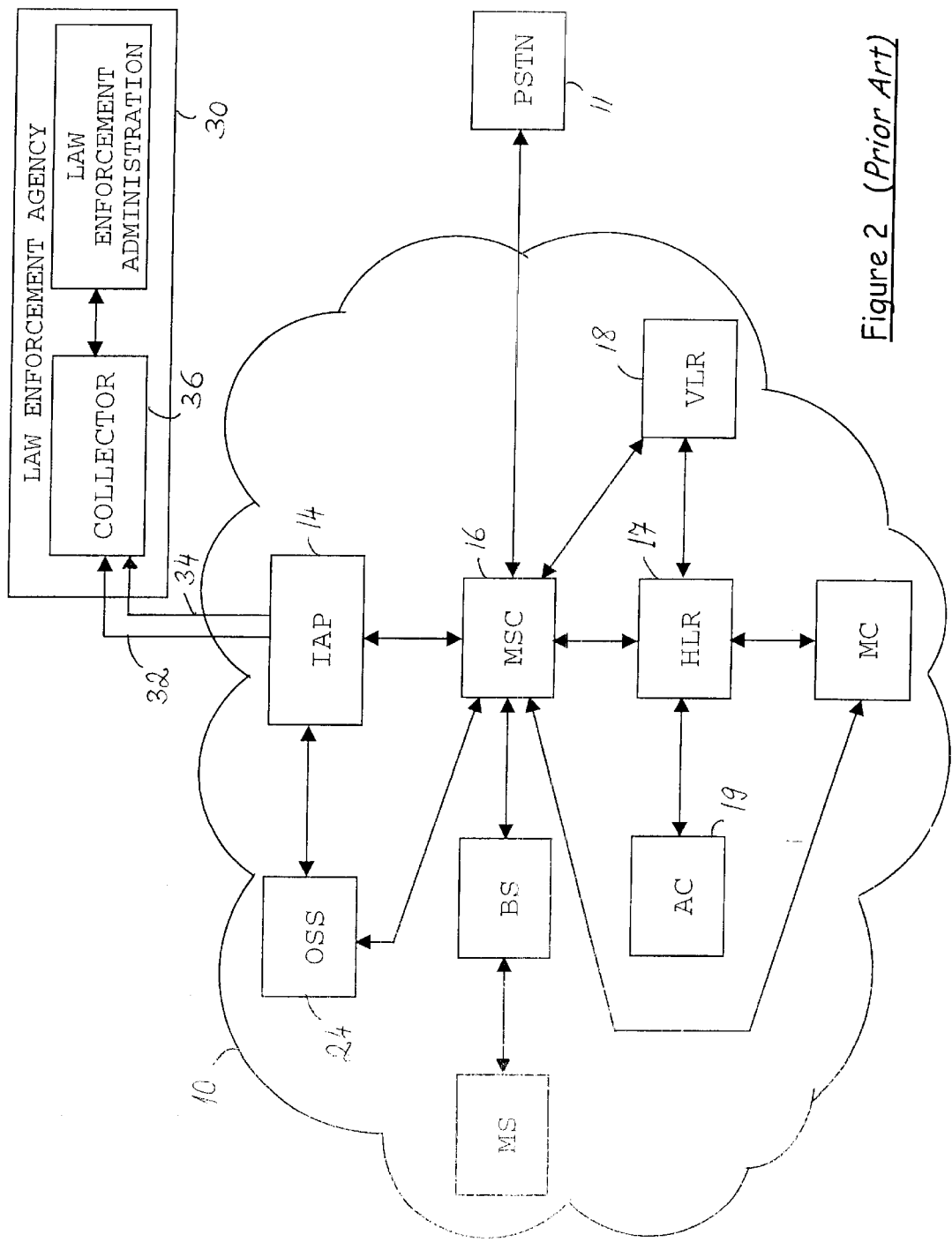
FIG. 2 (Prior Art) is a functional block diagram of the cellular telecommunications network having monitoring-related functions.

The reader is requested to take note that FIG. 1 shows the logical network reference model of the monitoring functionality within the cellular telecommunication network 10, while FIG. 2 shows the network diagram of such a cellular telecommunication network, including the nodes relating to the monitoring functionality.

The reader is further requested to take note that although the teachings of the present invention are preferably described with reference to a cellular telecommunication network 10 in communication with a Public Switched Telephone Network 11 (PSTN, fixed telephone network), the invented method may be implemented in the PSTN 11 only, in the cellular telecommunication network 10 only, or in any sub-set or combination of the previously mentioned networks.

The access sub-function 12, shown in FIG. 1, is typically embodied as one or more Intercept Access Points (IAPs) 14, connected to the appropriate nodes of the cellular telecommunication network 10, as shown in FIG. 2, or to the PSTN nodes (not shown). Typically, these nodes may be mobile switching centers (MSCs) 16, as shown in FIG. 2, since the MSCs 16 are the core of the cellular telecommunication network, and voice and data communication always go through at least one MSC where they are the most likely to be intercepted. The IAP is typically provided as a node within the cellular telecommunication network 10, or the PSTN 11, where the communications of a monitored subscriber are accessed. Alternatively, the IAP 14 may be co-located with the MSC 16.

Continuing to refer to FIG. 1, the delivery sub-function 18 delivers the intercepted communications to one or more collection sub-functions 20. The delivery sub-function 18 may deliver the intercepted information over two distinct types of channels, as shown in FIG. 2. A call content channel 32 may be used for transporting the intercepted call content, such as the voice or data communications. A call data channel 34 may be used for carrying messages reporting the call-identifying information, such as the identity of the calling party and the called party participating in the intercepted call, and/or other data relating to the participants to the communication, or to the communication itself.

The collection sub-function 20 is typically responsible for collecting and analyzing the intercepted communications and the call-identifying information of the monitored subscribers for a particular LEA.

The service provider administration function 22 may be provided as an operation system support node 24 (shown in FIG. 2), which is responsible for the control and maintenance of the cellular telecommunication network 10 of the service provider, including the control of the access and delivery sub-functions related to the subscriber monitoring function of the cellular network 10, which are under the responsibility of the cellular service provider.

The Law Enforcement Administration sub-function 26 typically comprises the final destination of the intercepted communications of the monitored subscribers. Once the information is collected, it may be analyzed, selected, and classified by the LEA agents who may use it for monitoring and potentially apprehending and/or incriminating suspects.

Typically, the collection sub-function 20 is under the responsibility of the LEAs. Therefore, it is the LEAs that collect the information sent by the cellular operators from the delivery sub-function 18.

Reference is now made particularly to FIG. 2 which illustrates additional details of the cellular telecommunication network 10, and its relationship with the Law Enforcement Agencies. As one skilled in the art will notice, typical nodes of the cellular telecommunication network 10 are illustrated. The MSC 16 (only one MSC is shown, although a plurality of MSCs typically exist within a cellular telecommunication network 10) is responsible of the switching and distributing of communication within the cellular network. In other words, all communications of the cellular telecommunication network go through such an MSC 16 typically at least once. Therefore, it is logical that the IAP 14 is connected to the MSC 16, in order to be able to intercept communications of monitored subscribers.

A Home Location Register (HLR) 17, a Visitor Location Register (VLR) 18 and an Authentication Center (AC) 19 are conventionally disposed as separate nodes in the cellular telecommunications network 10. Although the HLR 17 and AC 19 are depicted as separate nodes, it should be appreciated that in some implementations, they may be co-located as a single node.

It should be noted that the expression "marked subscriber" refers to a subscriber whose communications are to be monitored by the monitoring functionality of the cellular telecommunication network. Such monitoring can be achieved in various manners. One of ordinary skilled in the art should readily appreciate that the present invention is independent of the way cellular operators use for marking a subscriber for being monitored. However, for the sake of completeness and illustration, a brief description of some of the typical marking methods used in the telecommunications industry is provided hereinbelow.

According to one approach, the MSC 16 or the IAP 14 may comprise a database with data related to the monitored subscribers. All monitored subscribers whose communications are to be monitored from the MSC 16 have a record in that database and at call set-up, the MSC 16 or the IAP 14 verifies if identification data relating to the subscriber involved in the communication session being set up are present in the monitored subscribers' database. If so, the call will be monitored.

In a second possible approach, the subscriber profile is typically held within the HLR 17, and may comprises a field containing the information that communications involving the marked subscriber are to be monitored. According to this approach, when the HLR is interrogated by the MSC with the ANSI-41 LOCREQ message at call set-up, it answers with the locreq response to the MSC, and this locreq response may also contain information directing the MSC to monitor the call.

Other implementations are also possible. It is to be noted that the access sub-function 12 described hereinabove, may therefore take various forms. According to some network operators and/or cellular vendors, the IAP 14 may be co-located with the MSC 16. Typically, the IAP may simply comprise a software or hardware module implemented within the MSC 16. The module is responsible for accessing the communications relating to the marked subscriber, formatting data, and then forwarding the data to the delivery sub function 18. The delivery sub function 18 may also be provided as one or more software or hardware modules (depending on the manufacturer's preference), co-located or not with the MSC 16. As described hereinabove, the delivery sub-function 18 is interfaced with the delivery network comprising the channels 32 and 34.

As already stated, the present invention is independent of the proprietary implementations of the telephone network vendors and operators of the monitoring functionality within a cellular telecommunication network 10, or within the PSTN 11. Therefore, the expression "marked subscriber" refers to and comprises any one of these solutions, as well as others that would be apparent to one skilled in the art.

Continuing to refer to FIG. 2, once the call content and the call identification information are intercepted by the IAP 14, they are typically delivered, through the delivery function 18 to the Law Enforcement Agency 30. As stated, the delivery function 18 may also be provided as a software tool implemented as part of the MSC 16 or the IAP 14. Alternatively, the delivery function may comprise dedicated hardware circuitry for delivering the intercepted information to the LEA 30. As described in the foregoing, the delivery function 18 is associated with the delivery network comprising the call content channel 32 for delivering the call content information, such as the voice and data information, and the call data channel 34 for delivering the call identifying information.

The delivery function 18 delivers the intercepted information of the monitored subscriber to LEA 30 (only one LEA is shown in FIG. 2, although various LEAs may be connected to the same cellular telecommunication network 10). A collector module 36 performs the collection function 20 within the LEA, before forwarding the intercepted information to the LEA administration 26.

Figure 3:
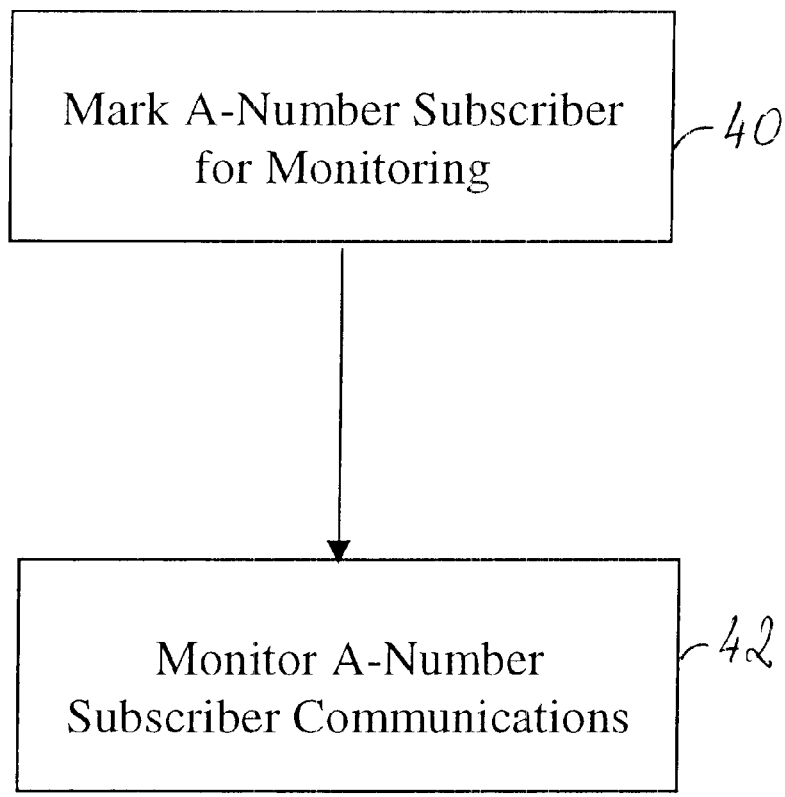
FIG. 3 (Prior Art) depicts a flow chart of a conventional method for monitoring cellular subscribers.

Reference is now made to FIG. 3 wherein there is shown a prior art method for monitoring a subscriber's communications. According to this method, a subscriber may be marked for being monitored, step 40, using one of the available techniques, such as those described hereinabove. It should be readily appreciated that the monitored subscriber may be a PSTN subscriber in some implementations. Once step 40, representing the marking for monitoring of the subscriber, is done, all incoming or outgoing communications of the monitored subscriber will be monitored (step 42).

Figure 4:
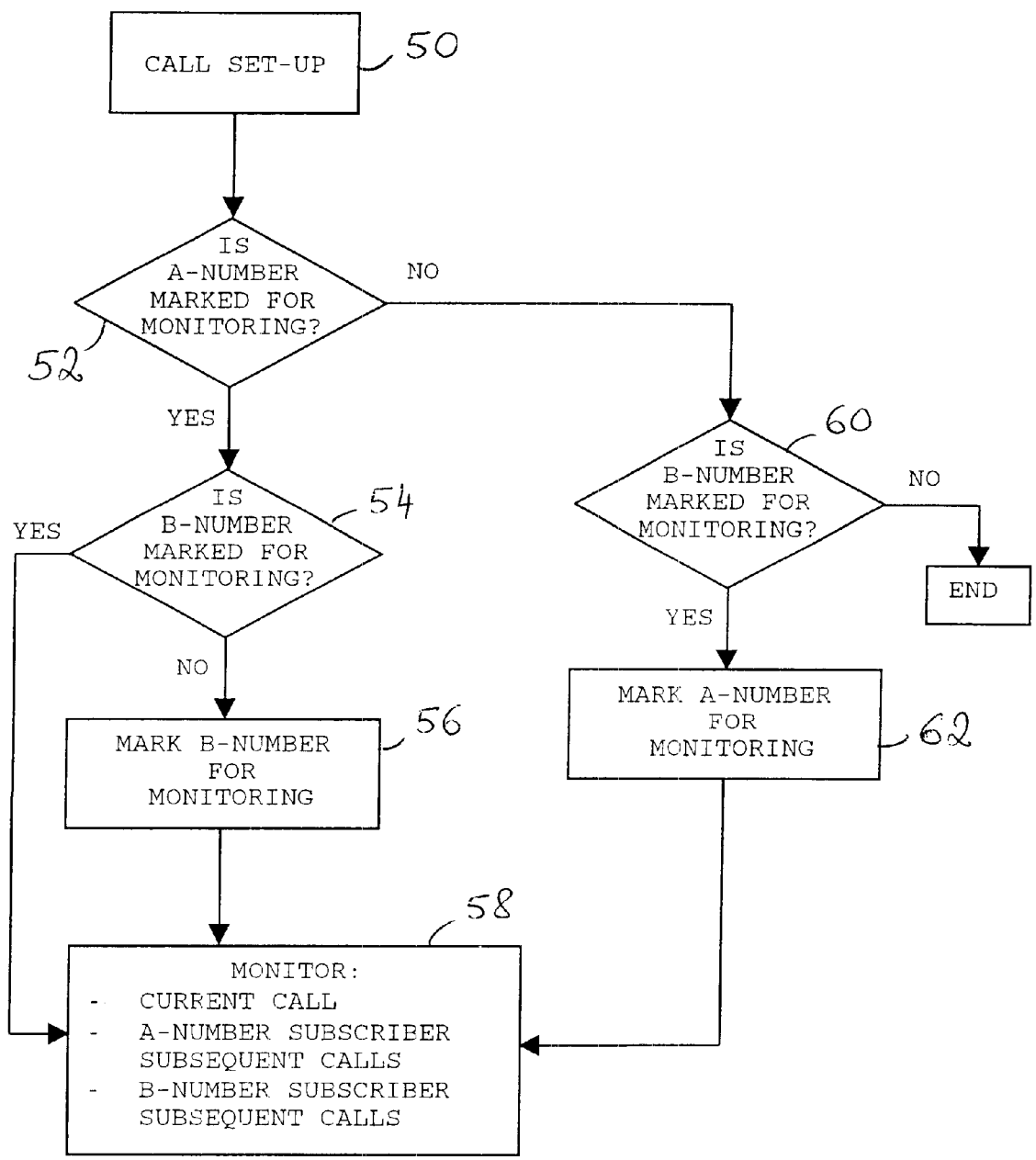
FIG. 4 depicts a flow chart of a presently preferred exemplary embodiment of a monitoring method in accordance with the teachings of the present invention.

Referring. now to FIG. 4, depicted therein is a flowchart of a presently preferred exemplary embodiment of the monitoring method in accordance with the teachings of the present invention. The invented method may be implemented using a software or hardware tool or module preferably integrated with the MSC 16 or the IAP 14. It should be appreciated by those skilled in the art upon reference hereto that the presently preferred exemplary embodiment of the present invention may be augmented in any fashion that is in conformity with some of the existing marking solutions described hereinabove.

According to the preferred implementation of the invented method, shown in FIG. 4, once a call is set up, step 50, it is determined whether or not the call originator subscriber, i.e., the A-number subscriber is marked for monitoring (step 52). If the A-number subscriber is marked for being monitored, step 54 is performed subsequently, wherein it is determined if the destination subscriber, i.e., the B-number subscriber is monitored or not. In the positive case, wherein both subscribers are monitored, the call is further intercepted and monitored, as described hereinbefore. In case the result of step 54 is negative, i.e. the B-number subscriber is not marked for being monitored, then the B-number subscriber will be marked for subsequent monitoring (step 56) according to the invented method, and then the current call will be monitored in step 58, as will be all subsequent calls emanating from or transmitted to the B-number subscriber.

In the right-hand part of FIG. 4, following a negative result of the step 52, i.e., after call set-up, it is determined that the A-number subscriber is not marked for being monitored, step 60 is performed where a decision is made whether the B-number subscriber is marked for monitoring. A positive answer at step 60 means that the B-number subscriber is indeed marked for monitoring and is followed by the automatic marking of the A-number subscriber for subsequent monitoring, step 62. Accordingly, the current call that is being set up is monitored, as shown in step 58 and described hereinabove.

Finally, in the case that none of the participating subscribers (A-number subscriber and B-number subscriber) is marked for being monitored, i.e. the results of steps 52 and 60 are both negative, then the current call is not to be monitored and none of the subscribers are marked for subsequent monitoring.

Although a presently preferred embodiment of the present invention is shown in FIG. 4, it should be noted that variants of the described method are possible without departing from the scope of the invention. For example, by detecting/determining whether or not any one of the participants in a communication session are marked for monitoring (more than two subscribers may participate), and in the positive case wherein at least one of the participating subscribers is marked for monitoring, all others may also be marked for monitoring. This can apply, for example, to conference calls wherein more than two subscribers are involved, or to any other type of communications over the cellular telecommunication network 10 and/or the PSTN 11, such as fax telecommunications, modem telecommunications or other types of telecommunications.

It should further be noted that the information required to determine/detect whether or not at least one participating subscriber is marked for monitoring may take different forms, and may come from different sources. According to the broad aspect of the invention, any type of subscriber marked for monitoring may be detected, and then participants in that particular communication may also be marked for monitoring. Such subscribers may comprise, but are not limited to, cellular subscribers and PSTN subscribers. In the case of PSTN subscribers and cellular subscribers participating in a conversation from remote networks with a cellular subscriber having its home network related to the MSC 16, there is a need for an indication that those subscribers are marked for monitoring, since they have no record neither in the local MSC 16, nor in the HLR 17. This indication may be provided at call set-up, from these remote subscribers' networks to the MSC 16 and/or to the IAP 14, so that the local MSC 16 and/or the local IAP 14 may mark the local subscriber for monitoring according to the teachings of the present invention.

Figure 5:
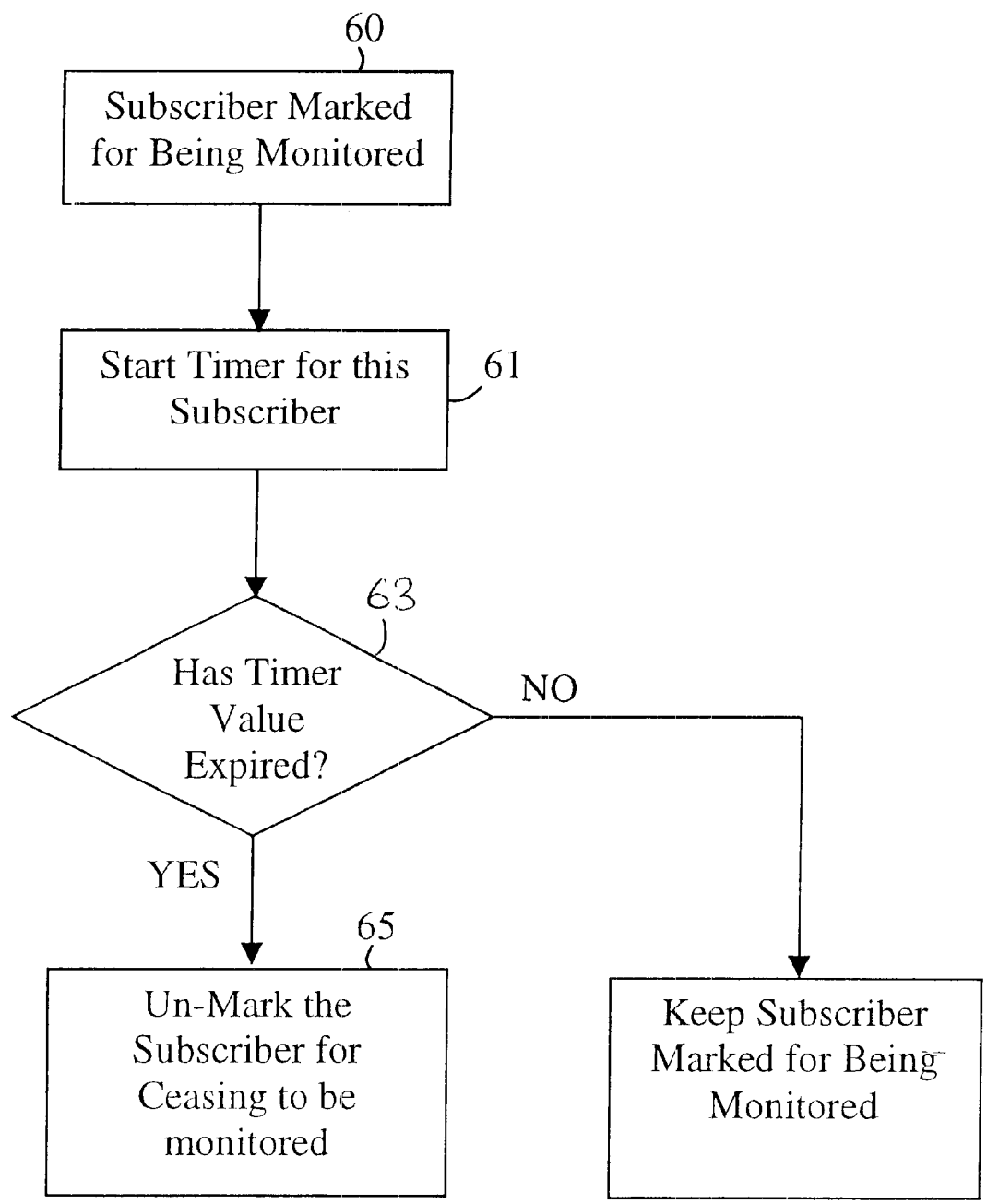
FIG. 5 depicts a flow chart of a second presently preferred exemplary embodiment of a monitoring method in accordance with the teachings of the present invention.

According to a second presently preferred exemplary embodiment of the present invention shown in FIG. 5, when a subscriber is newly marked for monitoring (step 60), for example, according to the steps set forth in relation to the first presently preferred exemplary embodiment of the invention, a timer is immediately started for each newly marked subscriber (step 61), and at expiration of a time-limit previously set up by an administrator, the corresponding subscriber is un-marked for ceasing to be monitored (step 65). Such a method may comprise a continuous or regular timer evaluation function, shown in step 63, whose responsibility is to evaluate whether or not the timer started for a subscriber has expired, that is, whether the elapsed time has exceeded an initially set-up threshold. It should be appreciated that the use of the timer mechanism avoids having too many subscribers being monitored at the same time which eventually could create a traffic jam on the channels 32 and 34, or overload the MSC's or IAP's processor, as the number of monitored subscribers increases over a period of time.

Figure 6:
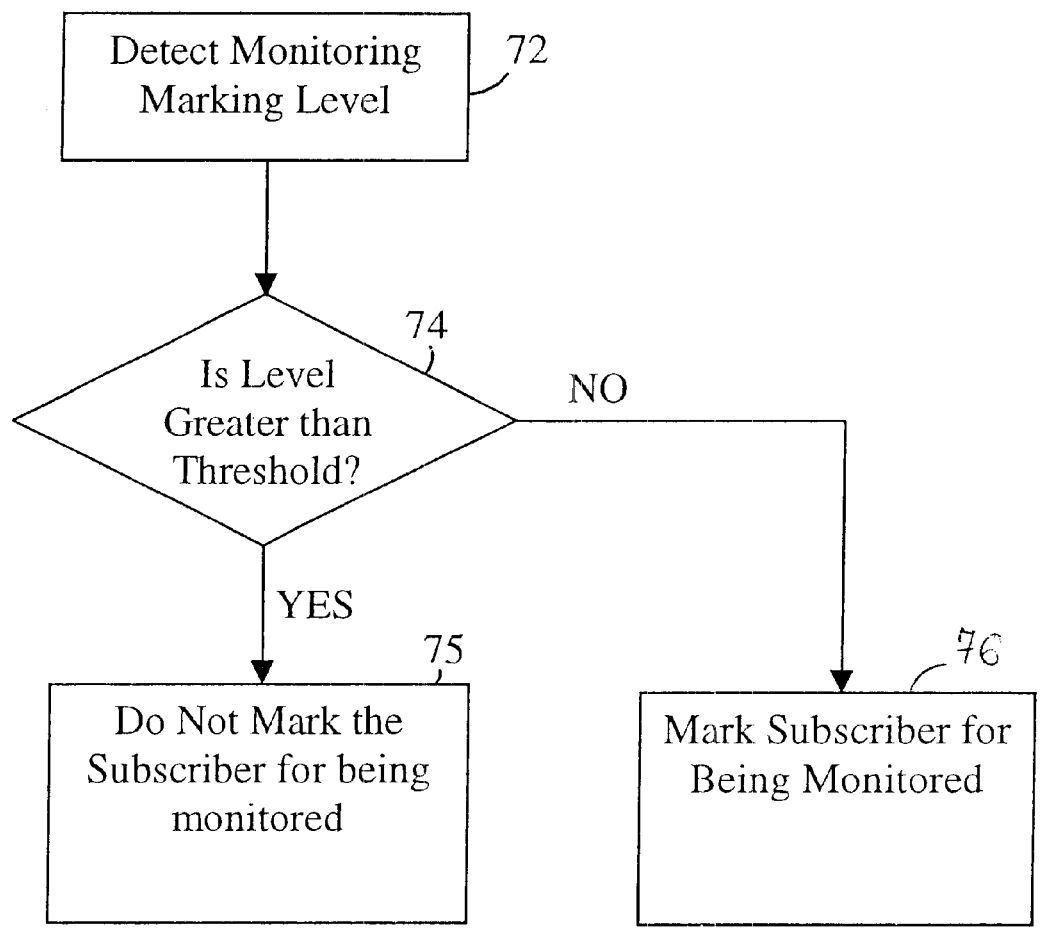
FIG. 6 depicts a flow chart of the third presently preferred exemplary embodiment of a monitoring method in accordance with the teachings of the present invention.
Figure 7:
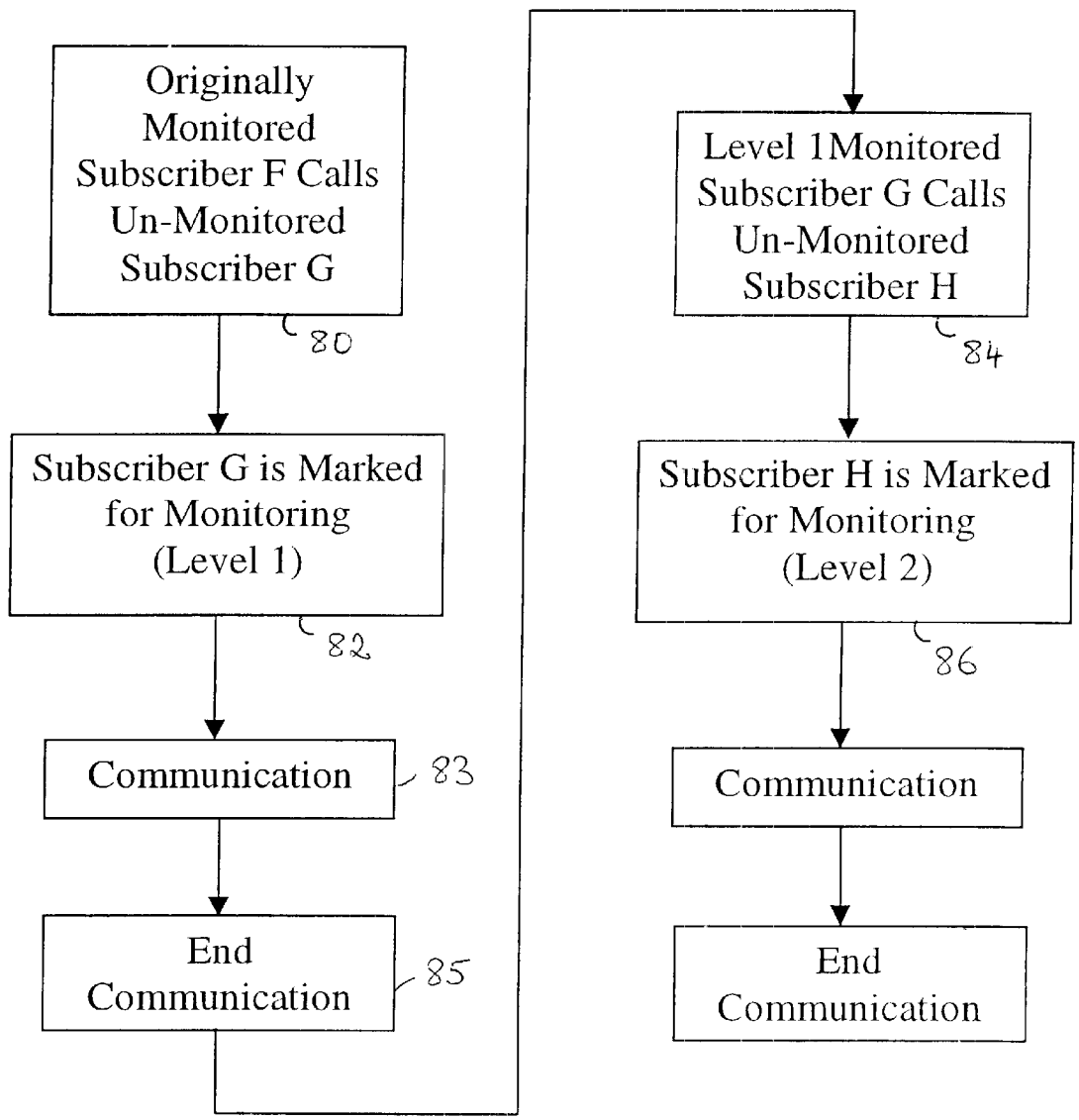
FIG. 7 depicts a flow chart for defining marking levels for cellular subscribers in accordance with the teachings of the present invention.

According to another presently preferred embodiment of the invention, shown in FIG. 6, prior to marking a subscriber for monitoring according to the hereinbefore described embodiments, a detection is performed for assessing a marking level associated with the subscriber (step 72). This marking level corresponds to the number of times an un-marked subscriber, to whom a new marking level (higher level) is to be assigned and participating in a communication session or transmission with a marked subscriber having a prior marking level (lower level), has been marked for monitoring. For example, as shown in FIG. 7, if subscriber F was originally marked for monitoring, and then called subscriber G (step 80), subscriber G would be marked for monitoring at call set-up (step 82). Thus, subscriber G is assigned a marking level equal to one (step. 82). Afterwards, subsequent to completing the communication session or transmission with subscriber F (steps 83 and 85), when subscriber G calls subscriber H (step 84), subscriber H also becomes marked for monitoring (step 86). The marking level for subscriber H is set at two (that is, one level higher than the marking level associated with subscriber G) and so on.

Referring back to FIG. 6, in step 74, a decision is taken regarding the marking level of the subscriber who is about to be monitored. The marking level is compared to a previously defined threshold, and if it is less than, or less than or equal to the threshold, the subscriber can be marked for monitoring (step 76, which may in some implementations correspond to steps 56 or 62 of FIG. 4). Otherwise, if the marking level is greater than the threshold, the subscriber does not get marked for monitoring purposes (step 75). It should be appreciated, accordingly, that by varying the threshold value, the operators may advantageously monitor a limited number of subscribers, in order to optimize their efforts and avoid overloading the system.

According to another exemplary embodiment of the invention, the automatic monitoring of the newly marked subscribers may also be limited by imposing a limit on the number of monitored communication sessions for each such subscriber. In accordance herewith, counting means for counting the number of communications sessions that are monitored for a subscriber may be implemented within the MSC 16 or the IAP 14. Once again, such counting means may be effectuated in software, hardware or firmware modules in order to perform the counting function. Once a pre-determined threshold is detected, the counting means may inform the marking means to un-mark the particular subscriber, so that the monitoring may cease thereafter. It should be realized that this is yet another embodiment, similar to those described above, for avoiding the overloading of the monitoring system of the telecommunications network.

One should take note that although the term "communication", "communication session" or "communication transmission" were used throughout the description of the present invention for being the trigger for automatic marking a subscriber, in a broad interpretation such terms also include a communication attempt that failed between at least two subscribers, a voice mail retrieval (such as when a monitored A-subscriber retrieves voice mail from an un-marked B-subscriber's voice mail), or any other type of telephone communication that involves at least two subscribers.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention as set forth and defined by the following claims. For example, the teachings of the present invention are independent of the type of data used by the cellular operators to trace communications of subscribers. Accordingly, either the MIN/MDN/IMSI data or ESN/IMEI data may be used in the practice of the present invention. Furthermore, although the designation "monitoring the subscriber" has been used throughout the description of the present invention, it should be understood that it refers to and comprises any kind of monitoring, such as monitoring of a piece of telecommunications equipment, the subscriber line, a communication session or transmission, or subscriber's communication attempt. It is contemplated herein that these and other variations are within the ambit of the present invention which is solely defined by the claims set forth bellow.

What is claimed is:

1. A method for automatically marking for monitoring at least one telephone subscriber participating in a communication transmission in a telephone network, the method comprising the steps of:

a) setting up the communication transmission in said telephone network between at least two telephone subscribers, said communication transmission emanating from a first subscriber and being directed to at least one second subscriber;

b) detecting if at least one of said at least two subscribers participating in said communication transmission is marked for monitoring; and c) upon detecting that at least one subscriber of said at least two subscribers participating in said communication transmission is marked for monitoring, automatically marking for being monitored all remaining subscribers participating in said communication transmission.

2. The method claimed in claim 1, further comprising the step of:

d) monitoring subsequent communication transmissions emanating from subscribers marked for being monitored.

3. The method as claimed in claim 2, wherein said telephone network is selected from the group consisting of a cellular telephone network, a Public Switched Telephone Network, a portion of the cellular telephone network, a portion of the Public Switched Telephone Network, and a cellular telecommunication network connected with a Public Switched Telephone Network.

4. The method as claimed in claim 2, wherein step d) is performed for a selected period of time.

5. The method as claimed in claim 1, wherein step c) further comprises, prior to automatically marking said remaining subscribers for being monitored, the steps of:

detecting a subscriber marking level for each of said remaining subscribers to be marked for being monitored;

comparing said subscriber marking level with a pre-defined threshold; and if said subscriber marking level satisfies a pre-defined condition relating to a threshold value associated therewith, proceeding with automatically marking each of said remaining subscribers for monitoring.

6. The method as claimed in claim 1, wherein only a selected number of communication transmissions involving one of said marked subscribers are monitored, whereby when said selected number is attained, said marked subscribers are un-marked such that said marked subscribers cease to be monitored.

7. A telephone network comprising:

communication switching means for setting up communications between at least two subscribers;

intercepting means for intercepting at least one of the content and the identifying information of said communications, said intercept means being connected to said communication switching means; and monitoring marking means for detecting the presence of a monitored subscriber among said at least two subscribers and for marking for monitoring a telephone subscriber, wherein when said switching means sets up a communication session between said at least two subscribers, said monitoring marking means detects if at least one of said at least two subscribers is marked for monitoring and upon detection of a monitored subscriber, automatically marks for monitoring all remaining participants to in said communication session.

8. The telephone network as claimed in claim 7, further comprising a timer associated with said monitoring marking means for establishing a pre-determined time period for monitoring of said communication session.

9. The telephone network as claimed in claim 7, further comprising marking level detection means for detecting a monitoring marking level of a subscriber intended to be marked for monitoring, whereby when a detected monitoring marking level satisfies a pre-defined condition for marking a subscriber for monitoring, said marking level detection means marks said subscriber for being monitored.

10. The telephone network as claimed in claim 7, further comprising communication counting means for counting a number of monitored communication sessions for a particular monitored subscriber, said communication counting means starting from when said particular subscriber is marked for monitoring, wherein when a pre-defined threshold value associated with said communication counting means is reached, said communication counting means instructs said marking means for un-marking said particular subscriber so that said particular subscriber ceases to be monitored.

* * * * *